United States Patent Office 3,794,699
Patented Feb. 26, 1974

3,794,699
N-(S,S-DIALKYLDITHIOPHOSPHO) UREAS
Francis J. Freenor III, Richmond, Calif., assignor to Chevron Research Company, San Francisco, Calif.
No Drawing. Filed Apr. 10, 1972, Ser. No. 242,464
Int. Cl. C07f 9/24; A01n 9/36
U.S. Cl. 260—938    10 Claims

ABSTRACT OF THE DISCLOSURE

Compounds of the formula

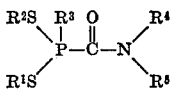

wherein $R^1$ and $R^2$ independently are alkyl of 3 to 10 carbon atoms; $R^3$ and $R^4$ independently are alkyl of 1 to 6 carbon atoms or monocyclic aryl of 6 to 10 carbon atoms and substituted with up to 4 fluoro or chloro groups and up to 2 nitro groups and $R^5$ is hydrogen or alkyl of 1 to 6 carbon atoms, with the proviso that at least one $R^3$ or $R^4$ group has at least 3 carbon atoms, and with the further proviso that $R^1$ and $R^2$ together can form a divalent alkylene group of 2 to 3 carbon atoms.

BACKGROUND OF THE INVENTION

Field

The present invention is related to herbicidal ureas wherein a nitrogen atom of the urea is substituted with a phosphorus-containing group through a N—P bond.

Prior art

A variety of N-substituted ureas are known. Most known N-substituted ureas have substituents attached to a nitrogen atom through a N—C bond. Examples of N-subsituted ureas wherein the substituent is attached through a N—S bond are also known. See, for example, copending application Ser. No. 88,106 of M. S. Brown, common assignee, filed Nov. 9, 1970, which discloses N-hydrocarbyldithio-substituted ureas.

DESCRIPTION OF THE INVENTION

The compounds of the present invention are represented by the following formula

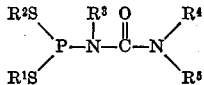

wherein $R^1$ and $R^2$ independently are alkyl of 3 to 10 carbon atoms; $R^3$ and $R^4$ independently are alkyl of 1 to 6 carbon atoms or monocyclic aryl of 6 to 10 carbon atoms and optionally substituted with up to 4 (0 to 4) fluoro or chloro groups and up to 2 (0 to 2) nitro groups and $R^5$ is hydrogen or alkyl of 1 to 6 carbon atoms, with the proviso that at least one $R^3$ or $R^4$ group has at least 3 carbon atoms, and with the further proviso that $R^1$ and $R^2$ together can form a divalent alkylene moiety of 2 to 3 carbon atoms (e.g., —CH$_2$CH$_2$— and

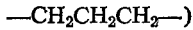

—CH$_2$CH$_2$CH$_2$—)

Illustrative $R^1$ and $R^2$ groups are n-propyl, isopropyl, n-butyl, isobutyl, n-pentyl, isohexyl, n-hexyl, n-heptyl, n-octyl and n-decyl. Preferred $R^1$ and $R^2$ groups are n-alkyl groups.

Illustrative alkyl $R^3$ or $R^4$ groups are methyl, ethyl, n-propyl, isopropyl, n-butyl, n-pentyl and n-hexyl. Illustrative aryl $R^3$ or $R^4$ are hydrocarbon aryl groups such as phenyl; alkaryl groups of 7 to 10 carbon atoms, such as tolyl, xylyl, 4-ethylphenyl, 2,4-diisopropylphenyl; and aralkyl groups of 7 to 10 carbon atoms, such as benzyl and 3-phenylpropyl. Illustrative halo and nitro substituted aryl $R^3$ and $R^4$ groups are halo and nitro-substituted phenyl, such as 2-fluorophenyl, 3-fluorophenyl, 4-fluorophenyl, 3-chlorophenyl, 4-chlorophenyl, 2,4-difluorophenyl, 3,5-difluorophenyl, 3,4-difluorophenyl, 3,4-dichlorophenyl, 2,4,6-trifluorophenyl, 3,4-dichloro-4,5-difluorophenyl, 2-nitrophenyl, 3-nitrophenyl, 4-nitrophenyl, 3,5-dinitrophenyl, 2,4-dinitrophenyl and halo and nitro substituted alkaryl and aralkyl groups of 7 to 10 cargon atoms, such as 2-fluoro-4-methylphenyl, 3,5-dichloro-4-methylphenyl, 2-nitro-4-ethylphenyl, 2-methyl-4-chlorophenyl, 4-nitrobenzyl, 2-fluorobenzyl. Preferred $R^3$ and $R^4$ groups are methyl and phenyl substituted with 1 to 2 fluoro groups or 2 chloro groups.

Illustrative alkyl $R^5$ groups are methyl, ethyl, n-propyl, n-butyl and isobutyl. The preferred alkyl $R^5$ group is methyl.

Representative compounds of the invention are

N-methyl-N-(S,S-dipropyldithiophospho)-N'-methyl-N'-(3-chlorophenyl) urea,
N-methyl-N-(S,S-dibutyldithiophospho)-N'-methyl-N'-(3-nitrophenyl) urea,
N-methyl-N-(S,S-dihexyldithiophospho)-N'-methyl-N'-(3,5-dinitrophenyl) urea,
N-methyl-N-(S,S-diheptyldithiophospho)-N'-butyl-N'-(3,4-dichlorophenyl) urea,
N-methyl-N-(S-butyl-S-hexyldithiophospho)-N'-methyl-N-(3,5-difluorophenyl) urea,
N-(2-fluorophenyl)-N-(S,S-dihexyldithiophospho)-N'-methyl-N'-propyl urea,
N-(3-fluorophenyl)-N-(S,S-dipentyldithiophospho)-N'-methyl-N'-butyl urea,
N-(4-fluorophenyl)-N-(S,S-dibutyldithiophospho)-N',N'-dimethyl urea,
N-(2,4-difluorophenyl-N-(S,S-diisopropyldithiophospho)-N',N'-dimethyl urea,
N-(3,5-dichlorophenyl)-N-(S,S-didecyldithiophospho)-N'-methyl-N'-isopropyl urea,
N-phenyl-N-(S,S-dibutyldithiophospho)-N',N'-dimethyl urea,
N-benzyl-N-(S-propyl-S-butyldithiophospho)-N',N'-dimethyl urea,
N-(4-nitrobenzyl)-N-(S,S-dibutyldithiophospho)-N',N'-dimethyl urea,
N-methyl-N-(S,S-dipropyldithiophospho)-N'-(3,5-dichloro-4-methylphenyl) urea,
N-(3-nitrophenyl)-N-(S,S-diisobutyldithiophospho)-N',N'-dimethyl urea,
N-methyl-N-(S,S-diheptyldithiophospho)-N'-(3,4-dichlorophenyl) urea,
N-ethyl-N-(S,S-dihexyldithiophospho)-N'-(2-fluorophenyl) urea,
N-propyl-N-(S,S-dihexyldithiophospho)-N'-butyl urea,
N-methyl-N-(S,S-dihexyldithiophospho)-N'-hexyl urea,
N-(2-fluorophenyl)-N-(S,S-dioctyldithiophospho)-N'-(3,4-dichlorophenyl) urea.

Representative compounds of the invention wherein $R^1$ and $R^2$ together form a divalent alkylene group are N-(ethylene-1,3-dithiophospholanyl) - N - (3,4 - difluorophenyl)-N,N'-dimethyl urea and N-(propylene-1,3-dithiophospholanyl)-N-(4-fluorophenyl)-N'-methyl - N' - isopropyl urea.

Largely due to greater herbicidal activity, preferred compounds of the invention are those wherein one $R^3$ or $R^4$ group is aryl and the other $R^3$ or $R^4$ group is alkyl. Particularly preferred compounds are those where one $R^3$ or $R^4$ group is phenyl substituted with 1 to 2 fluoro groups or 2 chloro groups, preferably in the meta and/or para positions when the halo substituents are chloro groups, and one $R^3$ or $R^4$ is lower alkyl, of 1 to 2 carbon atoms, especially methyl. It has been found that ureas of the invention containing $R^3$ or $R^4$ aryl groups having an ortho-chloro substituent are less active herbicides.

The compounds of the invention wherein $R^5$ is hydrogen are prepared by the reaction of a secondary S,S-dialkyldithiophosphoro amine (II) and an isoyanate (III) according to the following reaction (1):

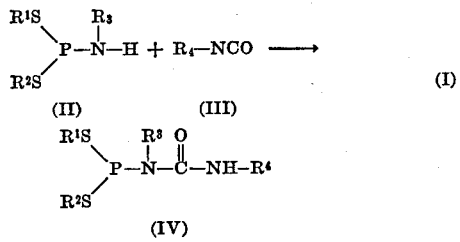

wherein $R^1$, $R^2$, $R^3$ and $R^4$ have the same significance as defined in Formula I.

The compounds of the invention wherein $R^5$ is alkyl are prepared by the reaction of a tertiary S,S-dialkyldithiophosphoroamine (V) and an isocyanate (VI) according to the following reaction (2):

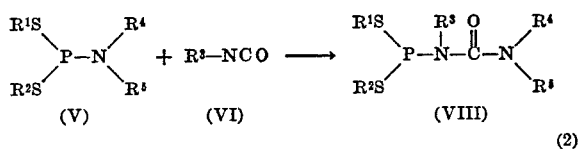

wherein $R^1$, $R^2$, $R^3$ and $R^4$ have the same significance as defined in Formula (I) and $R^5$ is alkyl as previously defined.

The reactions (1) and (2) are conducted by the conventional procedures generally employed for the addition reaction of isocyanates. Thus, reactions (1) and (2) are generally carried out with substantially equimolar amounts of the amine reactant (II or V) and the isocyanate reactant (III or VI), preferably in the presence of an inert solvent, such as ether or benzene, and in the presence of a small amount of a base catalyst such as a tertiary trialkylamine, e.g., triethylamine. Suitable temperatures vary from 0° to 50° C. The product (IV or VII) is isolated by conventional procedures such as evaporation of the solvent and purification of the product by chromatography, distillation, etc.

The secondary and tertiary S,S-dialkyldithiophosphoroamine reactants (II and V) are prepared by the reaction of a dialkyldithiophosphorus halide (VIII) and an amine (IX) according to the following reaction (3):

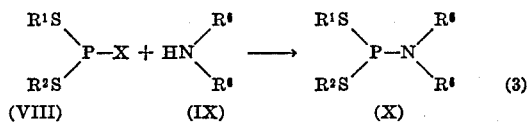

wherein X is a halogen, preferably chlorine, $R^6$ is $R^3$, $R^4$ and/or $R^5$, and $R^1$, $R^2$, $R^3$, $R^4$ and $R^5$ have the same significance as previously defined.

Generally, reaction (3) is accomplished by adding the amine slowly to the phosphorus chloride. Preferably an excess, e.g., up to twice the molar amount of the amine can be used. The excess reactant acts as a base acceptor to react with the evolved HX and thereby neutralize it. The reaction is preferably carried out in the presence of an inert solvent, such as methylene chloride ether, benzene, hexane, etc.

The reaction is preferably carried out at a temperature of from —78° C. to 30° C. Following the reaction, the product is recovered by conventional means. Thus, the reaction mixture may be stripped of solvent, the product washed with water and dried over magnesium sulfate.

The preparation of the compounds of the invention can be more fully understood by reference to the following examples.

EXAMPLE 1

Preparation of N-dibutyldithiophosphoro-N,N-diethylamine 100 ml. of methylene dichloride plus a small amount of molecular sieves were mixed with 13.05 g. of S,S-di-n-butyl phosphorus chloride. Diethyl amine (7.8 g.) was added slowly. The resulting slurry was allowed to stand for approximately 24 hours. The resulting mixture was filtered and stripped to obtain a colorless oil which on chemical analysis showed:

Calculated, percent: S, 22.8; P, 11.01. Found, percent: S, 21.7; P, 11.8.

EXAMPLE 2

Preparation of N-methyl-N(S,S-dibutyldithiophosphoro)-N'-(3,4-dichlorophenyl) urea A solution of 4 g. N-(S,S-dibutyldithiophosphoro -N-methylamine, 3.14 g. 3,4-dichlorophenyl isocyanate and 0.5 ml. triethylamine in ether was allowed to stand for about 8–12 hours at room temperature (~25° C.). The ether was evaporated. The urea product was a yellow oil. The infrared showed carbonyl absorption at 5.9 micron. Elemental analysis showed:

Calculated, percent: Cl, 16.0; P, 7.3. Found, percent: Cl, 15.8; P, 6.7.

EXAMPLE 3

Preparation of N-(ethylene-1,3-dithiophosphorolanyl-N-(3,4-dichlorophenyl)-N',N'-dimethyl urea A mixture of 3.3 g. N-(ethylene-1,3-dithiophosphorolanyl)-N,N-dimethylamine [represented by the formula below]:

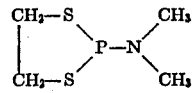

3.71 g. 3,4-dichlorophenyl isocyanate and 0.5 ml. triethylamine in methylene chloride was stirred at room temperature (~25° C.) for 2 hours. Evaporation of the solvent gave the urea product as a clear oil. Elemental analysis showed:

Calculated, percent: S, 18.1; Cl, 20.0. Found, percent: S, 17.5; Cl, 20.7.

Other compounds of the present invention were prepared by procedures similar to the above examples and are tabulated in the first column of Table I. The compounds tabulated in Table I were characterized by elemental analysis and infrared spectroscopy, and were all viscous oils.

UTILITY

The areas of the present invention are, in general, herbicidal in both pre- and post-emergence applications. For pre-emergence control of undesirable vegetation these ureas will be applied in herbicidal quantities to the environment, e.g., soil infested with seeds and/or seedlings of such vegetation. Such application will inhibit the growth of or kill the seeds, germinating seeds and seedlings. For post-emergence applications the ureas of the present invention will be applied directly to the foliage and other plant parts. Generally they are effective against weed grasses as well as broadleaved weeds. Some may be selective with respect to type of application and/or type of weed.

Pre- and post-emergence herbicidal tests on representative ureas of this invention were made using the following methods:

Pre-emergence test

An acetone solution of the test ureas was prepared by mixing 750 mg. urea, 220 mg. of a nonionic surfactant and 25 ml. of acetone. This solution was added to approximately 125 ml. of water containing 156 mg. of surfactant. Seeds of the test vegetation were planted in a pot of soil and the urea solution was sprayed uniformly onto the soil surface at a dose of 100 micrograms per cm.$^2$. The pot was watered and placed in a greenhouse at a temperature of about 80–85° F. The pot was watered intermittently and was observed for seedling emergence, health of emerging seedlings, etc. for a 3-week period. At the end of this period the herbicidal effectiveness of the urea was rated based on the physiological observations. A 0 to 100 scale was used; 0 representing no phytotoxicity, 100 representing complete kill.

Post emergence test

The test urea was formulated in the same manner as described for the pre-emergence test. The concentration of the urea in this formulation was 5000 p.p.m. This formulation was uniformly sprayed on the pot containing 24-day-old plants (approximately 15 to 25 plants per pot) at a dose of 100 micrograms per cm$^2$. The pots were then placed in a greenhouse at a temperature of 80–85° F. and then watered intermittently at their bases as needed. The plants were observed periodically for phytotoxic effects and physiological and morphological responses to the treatment. After 3 weeks the herbicidal effectiveness of the urea was rated based on these observations. A 0 to 100 scale was used; 0 representing no phytotoxicity, 100 representing complete kill. In Table I, the following abbreviations are used:

O=Wild Oats (*Avena fatua*)
W=Watergrass (*Echinochloa crusgalli*)
C=Crabgrass (*Digitaria sanguinalis*)
M=Mustard (*Brassica arvensis*)
P=Pigweed (*Amaranthus retroflexus*)
L=Lambsquarter (*Chenopodium album*)

The amount of the urea administered will vary with the particular plant part or plant growth medium which is to be contacted, the general location of application, i.e., sheltered areas such as greenhouses as compared to exposed areas such as field, as well as the desired type of control. For pre-emergent control of most plants dosages in the range of about 0.5 to 20 lbs. per acre will be used. Such administration will give a concentration of about 2 to 80 p.p.m. urea distributed throughout 0.1 acre-foot. For post-emergence application, such as foliar spray application, compositions containing about 0.5 to 8 lbs. urea per 100 gal. spray will be used. Such application is equivalent to about 0.5 to 20 lbs. urea per acre.

The herbicidal compositions of this invention comprise a herbicidal amount of one or more of the above described ureas intimately admixed with a biologically inert carrier. The carrier may be a liquid diluent such as water or acetone or a solid. The solid may be in the form of dust powder or granules. These compositions will also usually contain adjuvants such as a wetting or dispersing agent to facilitate their penetration into the plant growth media or plant tissue and generally enhance their effectiveness. These compositions may also contain other pesticides, stabilizers, conditioners, fillers and the like.

As will be evident to those skilled in the art, various modifications on this invention can be made or followed, in the light of the foregoing disclosure and discussion, without departing from the spirit or scope of the disclosure or from the scope of the following claims.

I claim:

1. Compound of the formula

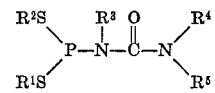

wherein $R^1$ and $R^2$ independently are alkyl of 3 to 10 carbon atoms; $R^3$ and $R^4$ independently are alkyl of 1 to 6 carbon atoms or monocyclic aryl of 6 to 10 carbon atoms and substituted with up to 4 fluoro or chloro groups and up to 2 nitro groups; and $R^5$ is hydrogen or alkyl of 1 to 6 carbon atoms, with the proviso that at least one $R^3$ or $R^4$ group has at least 3 carbon atoms and with the further proviso that $R^1$ and $R^2$ can together form a divalent alkylene group of 2 or 3 carbon atoms.

2. Compound of claim 1 wherein $R^5$ is hydrogen or methyl.

TABLE I

| Compound | Herbicidal effectiveness, pre-emergence/post-emergence | | | | | |
|---|---|---|---|---|---|---|
| | O | W | C | M | P | L |
| N-methyl-N-(S,S-dibutyldithiophosphoro-N'-(3,4-dichlorophenyl) urea | 20/90 | 55/95 | 95/0 | 95/100 | 95/100 | 100/100 |
| N-methyl-N-(S,S-dibutyldithiophosphoro-N'-(3-chlorophenyl) urea | 85/10 | 95/95 | 100/0 | 100/95 | 100/40 | 95/70 |
| N-(3-chlorophenyl)-N-(S,S-diisopropyldithiophosphoro)-N',N'-dibutyl urea | 25/10 | 10/0 | 0/0 | 25/30 | 10/0 | 0/0 |
| N-(3,4-dichlorophenyl)-N-(S,S-dibutyldithiophosphoro)-N',N'-dimethyl urea | 53/100 | 100/98 | 100/93 | 100/100 | 100/100 | 100/100 |
| N-isopropyl-N-(S,S-diisopropyldithiophosphoro)-N',N'-dimethyl urea | 83/0 | 0/56 | 45/0 | 0/80 | 0/30 | 0/40 |
| N-(3-nitrophenyl)-N-(S,S-diisopropyldithiophosphoro)-N',N'-dimethyl urea | 85/10 | 70/85 | 90/10 | 95/85 | 95/70 | 100/25 |
| N-methyl-N-(S,S-dioctyldithiophosphoro)-N'-(3,4-dichlorophenyl) urea | 55/100 | 100/90 | 100/95 | 100/100 | 100/100 | 100/100 |
| N-(3,4-dichlorophenyl)-N-(S,S-dioctyldithiophosphoro)-N',N'-dimethyl urea | 85/50 | 100/100 | 90/85 | 100/100 | 95/100 | 100/100 |
| N-(3,4-dichlorophenyl)-N-(S,S-dihexyldithiophosphoro)-N',N'-dimethyl urea | 75/50 | 100/100 | 100/20 | 100/100 | 100/100 | 100/100 |
| N-butyl-N-(S,S-diisopropyldithiophosphoro)-N',N'-dimethyl urea | 0/0 | 0/35 | 0/0 | 35/35 | 45/35 | 30/30 |
| N-isopropyl-N-(S,S-dibutyldithiophosphoro)-N',N'-dimethyl urea | 25/95 | 55/100 | 100/95 | 75/100 | 100/100 | 30/95 |
| N-isopropyl-N-(S,S-dihexyldithiophosphoro)-N',N'-dimethyl urea | 0/20 | 0/40 | 0/15 | 0/60 | 0/70 | 0/95 |
| N-methyl-N-(S,S-dihexyldithiophosphoro)-N'-(3,4-dichlorophenyl) urea | 70/100 | 100/100 | 100/95 | 100/100 | 100/100 | 100/105 |
| N-methyl-N-(S,S-dihexyldithiophosphoro)-N'-butyl urea | 30/35 | 45/35 | 50/45 | 95/95 | 80/60 | 100/100 |
| N-methyl-N-(S,S-dioctyldithiophosphoro)-N'-isopropyl urea | 10/0 | 10/0 | 10/0 | 10/10 | 0/25 | 0/30 |
| N-methyl-N-(S,S-dioctyldithiophosphoro)-N'-(2-fluorophenyl) urea | 100/100 | 100/100 | 100/100 | 100/100 | 100/100 | 100/100 |
| N-(3,4-dichlorophenyl)-N-(S,S-dipropyldithiophosphoro)-N',N'-diethyl urea | 50/55 | 25/95 | 70/80 | 90/100 | 100/100 | 100/100 |
| N-(3,4-dichlorophenyl)-N-(S,S-dipropyldithiophosphoro)-N',N'-dimethyl urea | 95/90 | 100/100 | 100/100 | 100/100 | 100/100 | 100/100 |
| N-isopropyl-N-(S,S-dipropyldithiophosphoro)-N',N'-dimethyl urea | 100/20 | 85/50 | 100/30 | 40/90 | 95/100 | 95/80 |
| N-(2-fluorophenyl)-N-(S,S-dipropyldithiophosphoro)-N',N'-dimethyl urea | 90/20 | 75/35 | 90/0 | 100/100 | 100/100 | 100/100 |
| N-(ethylene-1,3-dithiophospholanyl)-N-(3,4-dichlorophenyl)-N',N'-dimethyl urea | 100/100 | 100/100 | 100/100 | 100/100 | 100/100 | 100/100 |
| N-(ethylene-1,3-dithiophospholanyl)-N-(2-fluorophenyl)-N',N'-dimethyl urea | 100/75 | 95/60 | 100/60 | 100/100 | 100/100 | 100/100 |
| N-methyl-N-(S,S-dipropyldithiophosphoro)-N'-(3,4-dichlorophenyl) urea | 50/70 | 55/0 | 90/0 | 100/100 | 100/100 | 100/100 |
| N-methyl-N-(S,S-dihexyldithiophosphoro)-N'-isopropyl urea | 10/0 | 0/0 | 0/0 | 10/0 | 10/0 | 10/0 |
| N-methyl-N-(S,S-dihexyldithiophosphoro)-N'-(2-fluorophenyl) urea | 100/95 | 100/90 | 95/20 | 100/100 | 100/75 | 100/100 |
| N-methyl-N-(S,S-dipropyldithiophosphoro)-N'-(2-fluorophenyl) urea | 25/0 | 50/0 | 65/0 | 95/95 | 60/60 | 75/80 |
| N-methyl-N-(S,S-dihexyldithiophosphoro)-N'-methyl urea | 0/0 | 0/0 | 0/0 | 0/0 | 0/0 | 0/5 |
| N-methyl-N-(S,S-diisopropyldithiophosphoro)-N',N'-dimethyl urea | 0/0 | 0/0 | 0/0 | 0/10 | 0/25 | 0/10 |
| N-methyl-N-(S,S-dipropyldithiophosphoro)-N'-methyl urea | 0/0 | 15/0 | 50/0 | 0/25 | 0/25 | 0/20 |

3. Compound of claim 1 wherein one $R^3$ or $R^4$ group is methyl and the other $R^3$ or $R^4$ group is aryl substituted with 1 to 4 fluoro or chloro groups.

4. Compound of claim 3 wherein one $R^3$ or $R^4$ group is methyl and the other $R^3$ or $R^4$ group is phenyl substituted with 2 chloro groups or 1 to 2 fluoro groups.

5. Compound of claim 4 wherein $R^5$ is hydrogen or methyl.

6. Compound of claim 5 wherein $R^1$ and $R^2$ are the same n-alkyl group.

7. Compound of claim 6 wherein $R^1$ and $R^2$ are n-hexyl, $R^3$ is methyl, $R^4$ is 3,4-dichlorophenyl and $R^5$ is hydrogen.

8. Compound of claim 1 wherein $R^1$ and $R^2$ together form a —$CH_2CH_2$— group.

9. Compound of claim 6 wherein $R^3$ is methyl, $R^4$ is 2-fluorophenyl and $R^5$ is hydrogen.

10. Compound of claim 9 wherein $R^1$ and $R^2$ are hexyl.

References Cited
UNITED STATES PATENTS
3,384,683   5/1968   Schwarze _____ 260—938

ANTON H. SUTTO, Primary Examiner

U.S. Cl. X.R.

71—87; 260—937, 968, 984